3,563,967
PROCESS FOR POLYMERIZING A MIXTURE OF BI-SECONDARY ALIPHATIC MONO-OLEFINS AND PRIMARY-SECONDARY MONO-OLEFINS
Yves Chauvin, Orsay, and Gilles Lefebvre, La Celle-St.-Cloud, France, assignors to Institut Francais du Petrole des Carburants et Lubrifiants, Rueil-Malmaison, France
No Drawing. Filed Sept. 13, 1967, Ser. No. 667,343
Claims priority, application France, Sept. 14, 1966, 76,410; Sept. 15, 1966, 76,556
Int. Cl. C08f *1/56, 3/02*
U.S. Cl. 260—88.2
5 Claims

ABSTRACT OF THE DISCLOSURE

A process for polymerizing a mixture of bi-secondary and primary secondary olefins. The mixture is first reacted in the presence of a catalytic mixture comprising one metal compound from groups IVa and Va and a group Ia, II, IIIb, and IVb metal, hydride, or organometallic compound. Then adding a metal compound from group VI or VIII to the mixture and continuing the polymerization.

It had been described in a previous patent application, Ser. No. 412,366, now U.S. Pat. No. 3,479,329, filed by the applicants of the present application, a process for polymerizing bi-secondary aliphatic mono-olefins of the formula:

$$CHR_1=CHR_2$$

wherein radicals $R_1$ and $R_2$, which may be either identical to each other or different, are alkyl groups either branch-chained or not, each containing for instance, from 1 to 8 carbon atoms, these groups having optionally substituents, for instance halogens or aryl radicals.

The process is carried out by means of a catalyst comprising:

(a) At least one compound of a transition metal preferably pertaining to groups IVa and/or Va of the periodic classification of elements (referred to as respectively IVb and Vb at page 448 of the 41st edition of Handbook of Chemistry and Physics by Charles D. Hodgman—Chemical Rubber Publishing Co., 1959).

(b) At least one compound of a metal from groups VI and/or VIII, and (c) At least one metal from groups Ia, II, IIIb and/or IVb, or a reducing compound of the same metals (these groups are referred to respectively as Ia, II, IIIa and IVa in the aforementioned publication by C. D. Hodgman).

A detailed list of said catalysts is to be found in the above-mentioned patent to which the present description refers.

The obtained polymers exhibit a structure substantially identical to that of the polymers obtained from the corresponding primary-secondary mono-olefins, i.e. those having the same number of carbon atoms and the same carbonaceous structure.

For instance 2-butene forms poly (1-butene), 4-methyl 2-pentene forms poly (4-methyl-1-pentene), 2-hexene and 3-hexene result in the formation of poly (1-hexene).

By primary-secondary olefins it is understood those complying with the formula:

$$R_3—CH=CH_2$$ 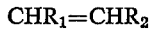

wherein $R_3$ is an alkyl radical containing at least 1 carbon atom.

It is known besides (Polymer Letters, volume 2, page 949 of 1964) that no other process than that of the applicants was available for polymerizing 4-methyl-2-pentene.

The present invention has for object the polymerization, in the presence of the above-mentioned catalysts, of at least one bi-secondary olefin selected from the group consisting of 4-methyl-2-pentene and 4,4-dimethyl-2-pentene, in admixture with a primary-secondary monoolefin containing at least 3 carbon atoms per molecule, by continuing the polymerization until the weight of normally solid polymer (solid at 20° C.) thus formed becomes higher than the weight of primary-secondary olefin used.

Generally these mixtures contain from 1 to 99% (preferably from 10 to 90%) in moles of bi-secondary monoolefin and 99 to 1% (preferably 90 to 10%) in moles of primary-secondary monoolefin.

According to a first embodiment of the invention the primary-secondary monoolefin exhibits the same carbonaceous structure and the same number of carbon atoms per molecule as the bi-secondary olefin and therefore only differs from the latter by the location of the double bond.

Such is the case for the following olefins mixtures:

(a) 4-methyl 2-pentene with 4-methyl-1-pentene
(b) 4,4-dimethyl 2-pentene with 4,4-dimethyl-1-pentene.

It has been discovered that in this case both olefins were consumed to give a polymer exhibiting interesting mechanical properties.

Although the exact structure of this polymer is not yet known with absolute certainty, it seems that said structure is similar to that of the homopolymer obtained either from the primary-secondary olefin polymerized by means of a conventional catalyst of the Ziegler type, or from the bi-secondary olefin polymerized by means of the catalyst described in the aforesaid patent to the present applicant, thus being essentially a structure of homopolymer of primary-secondary olefin, i.e. in the cases under consideration, respectively:

(a) the homopolymer of 4-methyl-1-pentene
(b) the homopolymer of 4,4-dimethyl-1-pentene.

According to a second embodiment of the invention, the primary-secondary monoolefin has a different number of carbon atoms or a carboneous structure different from that of the bi-secondary monoolefin.

In those cases there are obtained co-polymers exhibiting a linkage of 4-methyl-1-pentene or 4,4-dimethyl-1-pentene units with extraneous units, for instance propylene, 1-butene, 1-pentene and 1-hexene units.

According to the respective proportions of primary-secondary monoolefin and of bi-secondary monoolefin, there can be obtained a wide range of composition of co-polymers.

The practical conditions of polymerization are not substantially different from those described in the above-mentioned prior patents to the applicant, to which it can be referred for further details.

There will be described hereinafter a preferred way of carrying out the invention whereby a mixture of olefins such as that involved in the first embodiment is polymerized. This process consists of contacting said mixture in a first stage with a catalyst formed exclusively of the catalytic elements (a) and (c) as hereabove defined, under known conditions for homopolymerization of primary-secondary olefins, and thereafter of adding the element (b) of the catalyst so as to ensure the conversion of the bi-secondary olefin to said same homopolymer, during a second stage (if some primary-secondary olefin still remains, its polymerization continues).

During the first stage, the bi-secondary olefin is not consumed and the rate of polymerization of the primary-secondary olefin is relatively high. As soon as the primary-secondary olefin content in the mixture of mono-olefins has decreased below 10% by weight for example, and preferably below 5% by weight, the polymerization rate decreases and element (b) can be added to the catalyst without awaiting until a complete conversion of the primary-secondary olefin is achieved; for instance element (b) will be added when is reached a primary-secondary olefin content comprised between 1 and 10% by weight, preferably between 1 and 5%.

Of course, the above-mentioned two-stage process will have the maximum of advantages in the case of olefins mixtures having a high content in primary-secondary olefin, for instance a content higher than 5%, preferably higher than 10% by weight and which may be as high as 80%.

The so-observed improvement in the polymerization rate is an advantageous and surprising phenomenon. In fact, if the 3 catalyst elements (a, b and c) are introduced in the olefins mixture as soon as the polymerization commences, there is obtained a homopolymer of the same nature as that obtained in the two-stage process, but with a substantially lower polymerization rate.

It is still possible, although the results are less advantageous, to separate the catalyst at the end of the above-mentioned first stage, optionally with separation of the polymer formed at that stage; it is then required to introduce the complete catalyst (elements a, b and c) in the remaining olefin in order to continue the polymerization.

The polymer obtained by means of the two-stage process exhibits a distribution of the molecular weights over a wider range than that covered in the case of a polymer obtained by means of a single-stage process, said wide range being possibly advantageous in view of some further operations of conversion or shaping. The following examples are only given by way of illustration and are not intended to restrict in any way the scope of the invention. In these examples the temperatures are in ° C.

EXAMPLE 1

Into a reaction vessel of a 2 liters capacity preliminarily dried and free from air, are introduced under inert atmosphere:

1 liter of a mixture whose initial composition determined by gaseous chromatography is as follows:

| | Percent |
|---|---|
| 4-methyl 1-pentene | 7 |
| Cis 4-methyl 2-pentene | 16.6 |
| Trans 4-methyl 2-pentene | 73.9 |
| 2-methyl 1-pentene | 2.5 | and thereafter:

Monochlorodiethyl aluminum in an amount of 25 millimoles,
$TiCl_3$ (gamma) in an amount of 10 millimoles,
Nickel bis acetylacetonate in an amount of 0.08 g.

After stirring for 14 hours, at 40° C., there is taken a sample of 10 cc. of the liquid mixture by means of a syringe previously dried and free from air, then are added in the reaction vessel 200 cc. of methanol and there is separated a white cake which is drained, washed and dried under vacuum. There was so recovered 110 grams of a polymer, 95% of which were insoluble in heptane, and which melts at 235° C.

On observation of the X-rays diffraction film, the polymer is identified as being formed exclusively of poly 4-methyl 1-pentene. The obtained polymer may be compressed into plates at a temperature of 260° C. and with a pressure of 3 metric tons per cm.$^2$. The obtained plates are remarkable by their transparency.

The content of the syringe is filtered and then analyzed by gaseous chromatography, which shows the following composition:

| | Percent |
|---|---|
| 4-methyl 1-pentene | 2.4 |
| Cis 4-methyl 2-pentene | 17.0 |
| Trans 4-methyl 2-pentene | 77.1 |
| 2-methyl 1-pentene | 3.0 |
| 2-methyl 2-pentene | 0.5 |

It is remarkable and unexpected that the amount of poly 4-methyl 1-pentene produced is considerably higher than the amount of 4-methyl 1-pentene present in the reaction medium at the beginning of the reaction, which is an evidence that the 4-methyl 2-pentenes, cis and trans have participated in the formation of polymer by entering in the macromolecular chain with a different structure; accordingly they were not acting merely as a solvent or an inert diluent in the reaction.

On the contrary the 2-methyl 1-pentene which does not participate to the polymerization has its concentration slightly increased at the end of the reaction.

EXAMPLE 2

Into a reaction vessel of a 500 cc. capacity free from air and moistness, there are introduced 220 grams of a mixture of 4,4-dimethyl pentenes containing 0.9% of 4,4-dimethyl 1-pentene and 99.1% of 4,4-dimethyl 2-pentene, and then 0.7 g. of nickel acetylacetonate, 1.3 grams of $TiCl_3$ and 2.9 cc. of chlorodiethylaluminum. The mixture is stirred for 24 hours at 60° C.

There are obtained by precipitation with methanol, 3.6 grams of a crystalline polymer identical to poly 4,4-dimethyl 1-pentene.

EXAMPLE 3

Into a reaction vessel of a 1 liter capacity free from air and moistness and maintained under inert atmosphere, there are introduced 300 grams of a mixture of olefins having the following molar composition:

Butenes: 20% (of which 5% are 1-butene and 95% are 2-butene),
4-methyl pentenes: 80% (of which 4% are 4-methyl 1-pentene and 96% are 4-methyl 2-pentene).

There are subsequently added:

1.4 grams of $TiCl_3$,
0.036 gram of nickel acetylacetonate, and
2 cc. of chlorodiethylaluminum.

The mixture is stirred for 18 hours at 40° C. There are obtained 38 grams of a copolymer containing about 40% of "1-butene units" and 60% of "4-methyl 1-pentene units."

EXAMPLE 4

Into a reaction vessel of 1 liter capacity, free from air and moisture and maintained under nitrogen atmosphere, are introduced 300 grams of a mixture of 4-methyl pentenes, 11% of which are 4-methyl 1-pentene and 89% are 4-methyl 2-pentene.

There are subsequently introduced 0.9 gram of $TiCl_3$ gamma and 2.45 cc. of chlorodiethylaluminum.

Polymerization is allowed to continue at 40° C. for 5 hours (first stage).

There are then introduced 50 mg. of the complex $NiCl_2 \cdot 2P(C_6H_5)_3$.

The polymerization is allowed to continue for eight more hours. Then the polymer is separated by washing with methanol. There are thus obtained 58 grams of poly 4-methyl 1-pentene.

EXAMPLE 5

Into a reaction vessel of a 1 liter capacity, free from air and moistness and maintained under inert atmosphere, are introduced 300 grams of a mixture of 4-methyl pentenes containing 29% of 4-methyl 1-pentene and 71% of 4-methyl 2-pentene.

There are subsequently introduced 0.5 gram of $TiCl_3$ gamma and 1.9 cc. of chlorodiethylaluminum. The polymerization is allowed to continue for 6 hours at 40° C. The volatile hydrocarbons are separated from the polymer and the catalyst by evaporation under vacuum. There is so obtained a solid and dry residue which is then washed several times with methanol.

There are so recovered 68 grams of a polymer which will be further referred to as fraction (a).

The volatile hydrocarbon fraction which has been condensed (about 180 grams) consists of a mixture of 4- methyl pentenes whose content in 4-methyl 1-pentene is no more than 5%. There are added thereto 25 mg. of the complex $NiCl_2$-2-(triphenylphosphine), 0.3 g. of $TiCl_3$ gamma and 1.5 cc. of chlorodiethylaluminum and the polymerization is allowed to continue at 40° C. for 18 hours. The so-obtained suspension is treated with methanol and, after several washings, there are obtained 35 g. of a polymer which will be further referred to as fraction (b).

The respective polymers forming fractions (a) and (b) exhibit identical physical characteristics and both consist of poly 4-methyl 1-pentene.

The mixture of the two fractions is molded under pressure at 300° C.; by chilling of the mold there is obtained a transparent plate whose mechanical and optical characteristics are identical to those of a poly 4-methyl 1-pentene obtained in a conventional manner.

EXAMPLE 6

Into 300 grams of the same olefins mixture there are introduced, under the same conditions as in Example 5, but in a single stage, 0.8 g. of $TiCl_3$ gamma, 25 mg. of the complex $NiCl_2$ 2 triphenylphosphine and 3.4 cc. of chlorodiethylaluminum.

The polymerization has been allowed to continue for 24 hours. There were obtained no more than 58 grams of a polymer identical to that of Example 5, which makes apparent that the two-stage process of Example 5 is more advantageous than the single stage process according to the present example.

In the above description, by "reducing compound of a metal" is meant a metal hydride or an organometallic compound such as defined in the above-numbered application by the same applicants.

What is claimed as this invention is:

1. A process for polymerizing a mixture of olefins which consists of about 10 to 90% of a first olefin selected from the group consisting of 4-methyl-2-pentene and 4,4-dimethyl-2-pentene and about 90 to 10% of a second olefin selected from the group consisting of 4-methyl-1-pentene and 4,4-dimethyl-1-pentene wherein the second olefin has the same number of carbon atoms as the first olefin comprising:

contacting said mixture of olefins with a catalytic mixture of at least one compound of a metal from groups IVa and Va and at least one member selected from the group consisting of group Ia, II, IIIb, IVb metals, a hydride thereof, and an organometallic derivative thereof;

adding at least one compound of a metal from group VI or VIII to the mixture when the amount of said second olefin in the mixture is less than about 10% by weight of the mixture;

continuing the polymerization until the weight of polymer formed which is solid at 20° C. is at least greater than the weight of the second olefin initially present in the mixture said polymer having essentially the structure of a homopolymer of said second olefin.

2. The process of claim 1, wherein the compound of the group VI or VIII metal is added when the amount of the second olefin is less than about 5% by weight.

3. The process of claim 2, wherein the second olefin is initially present in the range of 10 to 80% by weight.

4. The process of claim 1, wherein the compound of the group VI or VIII metal is added when the amount of the second olefin is in the range of 1 to 5% by weight.

5. A process for polymerizing a hydrocarbon mixture of 10 to 90% by mol of 4-methyl-1-pentene with 90 to 10% by mol. of 4-methyl-2-pentene, said process comprising, in a first step, contacting said hydrocarbon mixture with a catalytic mixture of (a) a compound of a metal from group IVa or Va with (c) a metal of group Ia, II, IIIb or IVb or a hydride or organometallic derivative thereof, and, when the content of 4-methyl-1-pentene in the said hydrocarbon mixture is in the range of 1 to 5% by weight, adding (b) a compound of a metal from group VI or VIII while maintaining the contact with the catalytic mixture of the first step, and continuing the polymerization until the weight of polymer which is solid at 20° C. becomes higher than the weight of 4-methyl-1-pentene initially present in the reaction medium said polymer having essentially the structure of a homopolymer of 4-methyl-1-pentene.

References Cited

UNITED STATES PATENTS 3,197,452   7/1965   Natta et al. _____ 260—93.7

FOREIGN PATENTS 837,251   6/1960   Great Britain _____ 260—94.9E
1,027,758   4/1966   Great Britain _____ 260—94.9E JOSEPH L. SCHAFER, Primary Examiner E. J. SMITH, Assistant Examiner U.S. Cl. X.R.

252—429; 260—93.7